Feb. 9, 1965   N. S. CREASEY   3,168,790
BOBBER WITH LINE ATTACHING AND STORING MEANS
Filed Sept. 5, 1963   2 Sheets-Sheet 1
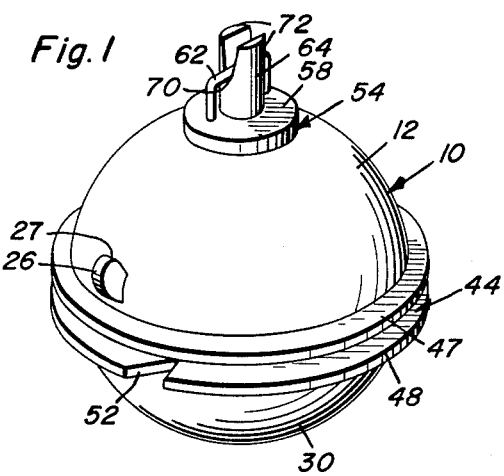
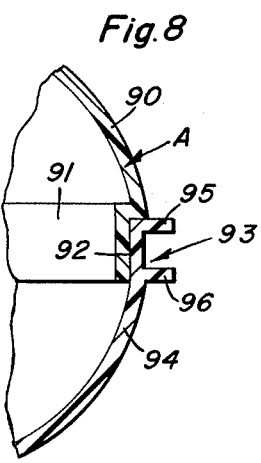
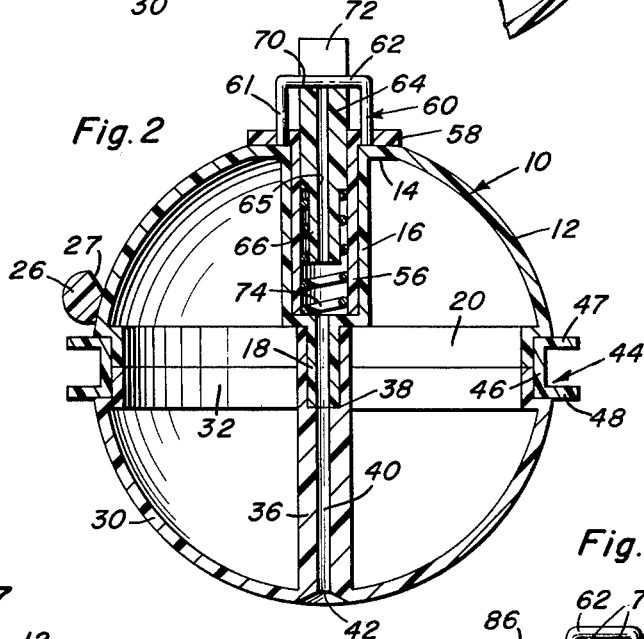
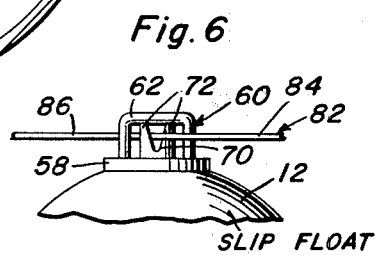
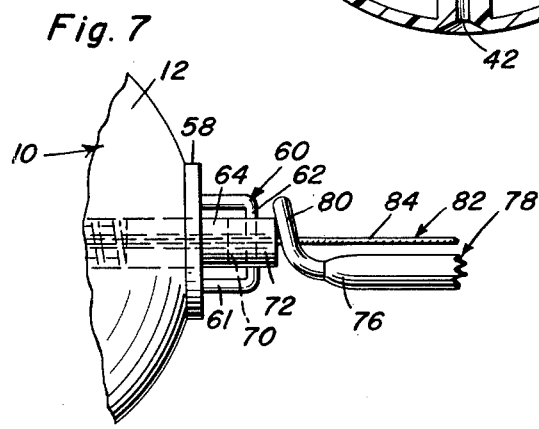
Norman S. Creasey
INVENTOR.

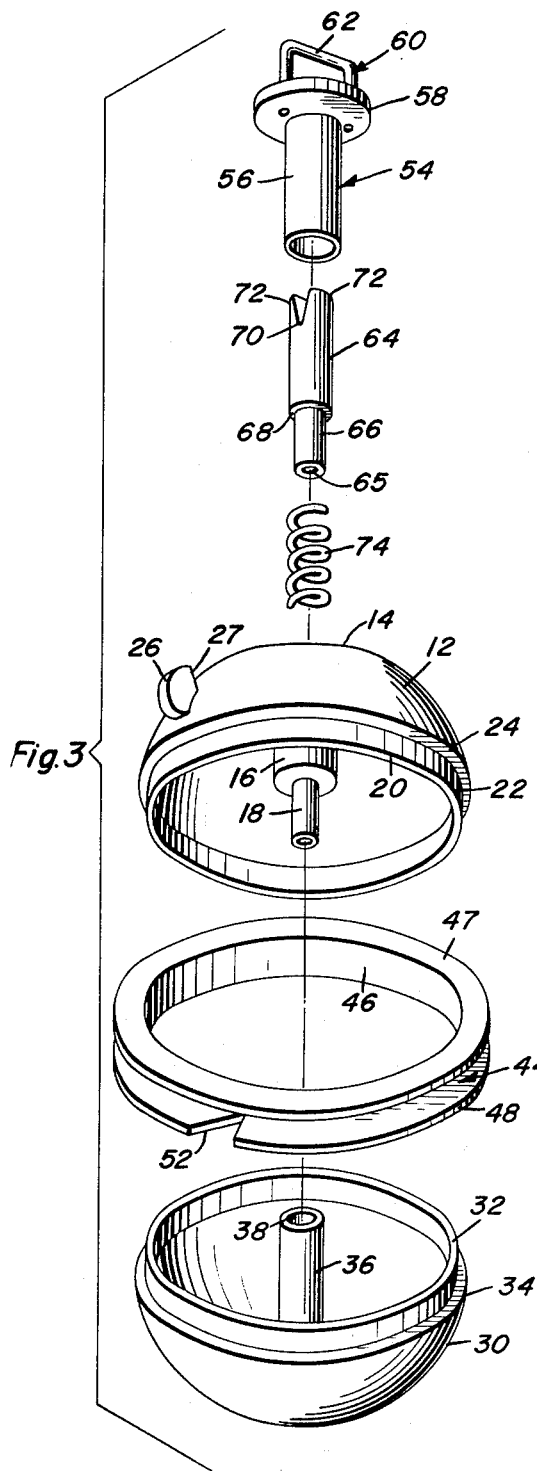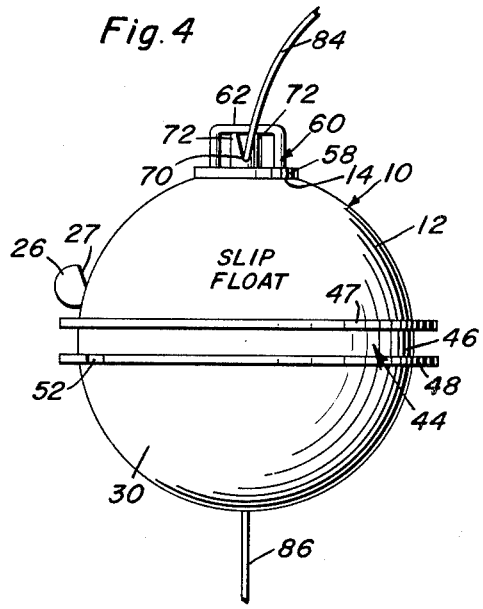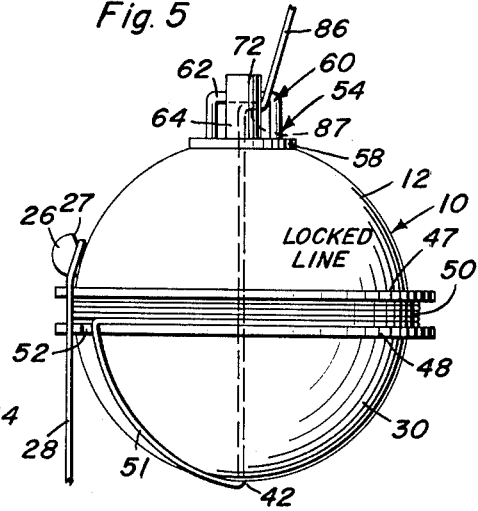
Norman S. Creasey
INVENTOR.

United States Patent Office 3,168,790
Patented Feb. 9, 1965

3,168,790
BOBBER WITH LINE ATTACHING AND
STORING MEANS
Norman S. Creasey, 1 Lake St., Amesbury, Mass.
Filed Sept. 5, 1963, Ser. No. 306,778
7 Claims. (Cl. 43—43.11)

This invention relates to a fishing float or bobber having line storing means and, in addition, complemental means whereby it can be employed as a slip float on the one hand or as a stationary or locked float on the other hand.

Briefly, the herein disclosed float comprises: a hollow plastic or an equivalent buoyant body of suitable size and shape having an axial passage for the leader portion of the line which is free-running therethrough. The body is mounted on said leader portion but not secured at any particular or predetermined place. The line is free to slide and the leader line length is optional. Accordingly, it depends on the tension or pull exerted by the angler on the main line. Novel connector means is provided at one end of the passage which permits the user to convert from a slip float to a locked float. To accomplish the locked float result the bobber is attached at a given place on the main line portion in order that the length of the depending leader portion may be regulated to comply with the user's fishing intensions.

As will be hereinafter clarified, the instant bobber is such in construction and adaptability that it can be cast a greater distance from the shore, dock or boat due to the fact that it can be placed in a casting position near the tip of the pole thus allowing the user to make his cast in the manner desired.

A predetermined amount of the line can be wound and stored in a channel-type spool and suspended from the bobber when it is resting on the surface of the water. Using a conventional bobber only a few feet (five or six feet) can be suspended below the bobber. The amount of the suspended leader portion of the line is usually determined by the length of the pole being used. With the herein disclosed improved bobber the amount of line suspended below the bobber is governed by the amount of line wound on the storing spool and could easily be 30 or 40 feet.

A significant improvement resides in the novel means which is provided on and projects radially from the normal top portion of the float and which functions in associating the line and float in a manner to provide the slip float and locked float functions.

By incorporating a spring-loaded plunger-type connector at the upper end of the line passage affords the user a definite advantage. Accordingly, when retrieving the line on the reel, as the tip of a spring-loaded latch comes into contact with the tip line guide on the fishing rod, the end thrust pressure thus attained serves to release the tension on the line in the crotch in which the line is seated and allows the line to be continuously retrieved without tension and until the fisherman has reeled in the necessary amount of line and so that he can control the bait or, alternatively, the catch.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a multipurpose float or bobber embodying the present invention with the fishing line omitted.

FIG. 2 is an enlarged view taken centrally through the float illustrated in FIG. 1.

FIG. 3 is an exploded perspective view.

FIG. 4 is a view in side elevation based on FIG. 1 and showing the line, the line being released to provide a free-running line, or alternatively, a slip float.

FIG. 5 is a view in elevation similar to FIG. 4 and wherein the line attaching means is latched to provide the aforementioned locked float and wherein, in addition, the lower or leader portion of the fishing line is stored on the float preparatory to initiating a cast.

FIG. 6 is a fragmentary view in elevation similar to FIG. 4 but showing the line free thus providing a slightly different slip float arrangement wherein the line does not pass through the axial passage of the float.

FIG. 7 is a view in side elevation showing a fragmentary portion of a conventional fishing rod, fishing line and a fragmentary portion of the upper part of the float and illustrating how the spring-loaded latch yields to the end thrust pressure of the eye on the rod to disengage the line so that it can be freely reeled and retrieved.

FIG. 8 is a fragmentary section showing a slight modification of the float body construction.

Referring first to FIGS. 1, 2 and 4 it will be noted that the hollow spherical or ball-like float is denoted by the numeral 10. It may be made of suitable plastic or other desirable float-making material. It comprises an upper semi-spherical half-section 12 having a slightly flattened axial top portion 14 provided interiorly with a depending axially extending cup 16 constituting a socket member, the lower end portion of the latter being reduced, as at 18 and axially bored and constituting a nipple-like extension. The open bottom is encompassed by an endless flange 20, the outer periphery 22 of which is spaced radially from the overhanging endless shoulder portion 24. This half-section is also provided exteriorly on one side with an outwardly radiating integral lug 26 having a cutaway line draping edge 27 which cooperates with the adjacent surface to provide a keeper seat for a depending portion 28 of the fishing line to be hereinafter described. The lower hemispherical half-section is denoted at 30 and conforms with the upper half-section and has an endless inset flange 32 which is spaced inwardly from the outwardly projecting shoulder 34. This half-section has an axial integral stem 36 which is of a length greater than the depth of the receptacle portion of the half-section, the upper end of which is counter-bored as at 38 to provide a socket for telescoping reception of the neck or nipple 18. This stem has an axial bore 40 which communicates with the lower flared line exit or orifice 42. The two half-sections 12 and 30 are aligned with coacting edge portions of the flanges 20 and 32 abutting each other and thus, after they have been suitably secured together, a groove is provided for reception and retention of the line winding and storing spool 44. The spool fits into the groove and embodies a web 46 and spaced flanges or channel walls 47 and 48. The channel portion consequently provides a storing channel for the coils of the wrapped portion 50 (FIG. 5) to be later described. The bottom channel wall or flange is provided with a V-shaped line clearance notch 52. With the two sections fastened together and the line winding and storing spool means 44 in place the neck 18 fitting into the socket 38 provides an axial line accommodating passage.

While the means for attaching or connecting the float to the line or, conversely, the line to the float, could be embodied or provided on the improved float in some other manner it is preferably an arrangement which is embodied in and constitutes a part of the line passage. To this end the bushing-like unit 54 (FIG. 3) comprises a sleeve 56 having a flanged upper end 58, said sleeve fitting telescopically and being friction held in the socket provided in the aforementioned cup or socket member 16 (FIG. 2). The flange 58 rests on the flat surface 14 and is tight-fitted in place and is provided on its top with an inverted U-shaped staple 60 having its legs 61 secured to the flange and its bight portion 62 straddling the open upper end of the sleeve. This sleeve in addition to mounting the flange and staple in place provides a bushing for the spring-loaded latch. This latch comprises a simple plunger 64 having a reduced lower end portion 66 defining a shoulder 68, the upper end being bifurcated and thus providing a crotch 70 between a pair of diametrically opposite furcations 72. These furcations define a fork. With the plunger in place as illustrated in FIG. 2 it is biased to either of its two positions (FIGS. 1 and 4) by way of a coil spring 74, said spring being located in the chamber provided by the sleeve 56 with the upper end of the spring encircling the reduced plunger portion 66 and the lower end bearing against the bottom of the cup or socket member 16. By making the parts strictly according to scale they can be assembled and maintained with the degree of certainty required in providing the finished ready-to-function float.

To facilitate understanding the best known mode of using the invention it will be helpful to refer to FIG. 7 wherein the terminal end portion 76 of a conventional fishing rod 78 is provided, as usual, with a terminal laterally directed guide eye 80 for the fishing line 82. The portion of the line to the right of the eye is differentiated as the main line 84 while all of that portion to the left is differentiated as the leader portion 86. A part of the leader portion is therefore inserted through the passage provided axially in the hollow float, that is the passage embodying the bore in the neck 18, bore 40 in the stem 36 and the bore 65 in the plunger 64. That portion which is draped over the lug 26 as at 27 is denoted at 28, the portion which is wound around the spool at 50 and the portion which is brought up from the bottom of the float and carried through the notch 52 is denoted at 51.

It will be noted that the normal spring biased position of the plunger-like latch 64 is as illustrated, for example, in FIGS. 1 and 2 wherein it will be observed that the bight portion 62 is seated in the crotch 70. It is permissible as illustrated in both FIGS. 4 and 6 to shove the plunger or latch down and impart a quarter turn thereto so that the prongs or furcations 72 are crosswise of the bight portion whereupon the bight portion then becomes a holddown for the latch. This may be called the open position of the latch while when the furcations straddle the bight portion the latch is closed.

To provide a slip float as illustrated in FIG. 4 the line has been threaded through the complete line passage and the normally closed latch has been forced down against the tension of the spring and turned at a right angle one-quarter turn to retain the latch in the open line swinging position. This arrangement results in the provision of a slip float. If one desires not to thread the line through the passage in the float the line can be passed through the crotch of the latch that is between the furcations in the manner shown in FIG. 6 with the latch held down by the bight portion of the holddown 60. With this arrangement the float is simply latched on the line but there is no positive connection.

Referring to FIG. 4 with the line threaded through the passage and then to FIG. 5 it will be seen that in the latter figure a portion 87 of the line is laterally bent in the crotch and the furcations 72 are caused to straddle the bight portion 62 thus jamming or clamping the line with the latch. This is the stationary or locked position of the float.

When used as a slip float by either method of slippage, the initial amount of leader line, as much as needed by the fisherman, can be wound in the storage space before making his cast. Other types of bobbers now on the market cannot accomplish this result.

When locking the float on the line as illustrated in FIG. 5 the amount desired as at 50 can be stored and the hook-equipped end portion 28 (not detailed) can be hung or draped over the lug 26.

The surplus line between the bobber and tip of the rod can be rewound on the reel the amount the fisherman desires, usually so that the bobber is within five or six inches of the eye 80. The bobber and bait are now in a position for casting. The fisherman can make the usual cast. When the cast has been made and the bobber rests on the surface of the water, a few twitches of the line and rod will release the depending portion and all of the line will unwind from the storage space. Or, when the bobber is a few feet from landing on the surface of the water the line can be snubbed at the reel which will in turn release the line and let the line unwind from the storage space. Using either method of releasing the line will allow the bait and full amount of the line that had been previously stored to be suspended from the bobber as it rests on the surface of the water.

With reference now to FIG. 8 only the hollow or body portion of the float is illustrated. It will be noted that this modification is conveniently designated at A and the upper half portion is denoted at 90, the same having an offset flange 91 the periphery of which is encompassed by the web portion 92 of an integral channel-shaped winding and storing spool 93 formed integrally with and as a part of the lower semi-spherical half portion 94. The line winding and retaining flanges of the channel or spool are denoted conveniently at 95 and 96.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A float comprising a buoyant body having a primary passage extending axially therethrough from top to bottom and through which a portion of the leader part of a fishing line may be slidingly threaded, means on a central exterior portion of said float for confining and releasably storing the line, the top portion of said body being provided with an inverted U-shaped staple fixedly mounted in the area immediately above said passage and providing a holddown member, a spring-loaded projectible and retractible plunger slidably mounted in the upper portion of said primary passage, said plunger having a secondary passage aligned with said primary passage, the upper end of said plunger being forked and the prongs of the fork being adapted to releasably straddle the bight portion of said staple.

2. The structure defined in claim 1 wherein said plunger is slidable and rotatable in said upper portion and wherein the prongs of the fork may be manually positioned and set in a position at right angles to the holddown member to in this manner depress the plunger against the action of the spring whereby said plunger may thus be held in its depressed line releasing slip float position.

3. A fishing float which can be selectively used as a slip float on the one hand and as a locked float on the other hand comprising: a buoyant body having a main passage extending therethrough from top to bottom, a spring-biased projectible and retractible plunger slidingly and rotatably mounted in an upper portion of said passage, said plunger having an auxiliary line passage aligned with said main passage, the upper end of said plunger being spring-projected to a position above the top of said body and constituting a manually set line locking and, alternatively, line releasing and freeing latch, and a latch holddown and setting member fixed atop said body immediately above and bridging said passage and latch and with which said latch is adjustably engageable, whereby when the latch is set in a first position relative to said member the line is allowed to pass freely through said passages to provide a slip float, and when alternatively set in a second position relative to said member can grippingly clasp the line between itself and said member to provide a locked float.

4. The structure defined in claim 3, and in combination, line spooling and storing means mounted on the median exterior portion of said body.

5. The structure defined in claim 3, and wherein said member comprises an inverted U-shaped staple the bight portion of which is oriented and confined to the area directly above and in alignment with said passages.

6. The structure according to claim 5, and wherein the extreme upper end of said latch is provided with a staple engaging fork, the prongs of said fork being adapted when in said first position to straddle and embrace said bight portion with the line seated in the crotch of the fork and forcibly clenched against the bight portion with said upper ends having end thrust engagement with said bight portion and said crotch spaced below and disengaged from said bight portion.

7. A fishing float which can be selectively used as a slip float on the one hand and as a locked float on the other hand comprising: a buoyant body having a main passage extending therethrough from top to bottom, a spring-biased projectible and retractible plunger slidingly and rotatably mounted in an upper portion of said passage, said plunger having an auxiliary line passage aligned with said main passage, the upper end of said plunger being spring-projected to a position above the top of said body and constituting a manually set line locking, and alternatively, line-releasing and freeing latch, an inverted U-shaped staple located in the area at the top of said body immediately above said passage and fixed atop said body with its bight portion directly above and bridging said passage, said bight portion providing a latch-setting and retaining member and with which said latch is adjustably engageable, the extreme upper end of said latch being bifurcated and the furcations defining a fork, the prongs of said fork being adapted when manually set in one position to embracingly straddle the bight portion in a manner to grip and lock the fishing line and when set in another position having their terminal portions abutting and spring-biased against said bight portion in a manner to release the latch and to permit the fishing line to slide freely through said passages.

References Cited in the file of this patent
UNITED STATES PATENTS

| | | |
|---|---|---|
| 2,591,332 | Behensky | Apr. 1, 1952 |
| 2,603,905 | Brzezinski | July 22, 1952 |
| 2,678,511 | Wright | May 18, 1954 |